US010718608B2

(12) United States Patent
Bindel et al.

(10) Patent No.: US 10,718,608 B2
(45) Date of Patent: Jul. 21, 2020

(54) MOBILE MEASUREMENT SYSTEM FOR THE THREE-DIMENSIONAL OPTICAL MEASUREMENT OF VEHICLES AND VEHICLE PARTS

(71) Applicant: Bayerische Motoren Werke Aktiengesellschaft, Munich (DE)

(72) Inventors: Steffen Bindel, Dresden (DE); Alexander Koenig, Rotterode (DE); Michael Heinz, Jesewitz (DE); Christopher Kurth, Landsberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 15 days.

(21) Appl. No.: 16/150,308

(22) Filed: Oct. 3, 2018

(65) Prior Publication Data

US 2019/0033063 A1    Jan. 31, 2019

Related U.S. Application Data

(63) Continuation of application No. PCT/EP2017/056605, filed on Mar. 21, 2017.

(30) Foreign Application Priority Data

Apr. 4, 2016   (DE) .......................... 10 2016 205 519

(51) Int. Cl.
*G01B 11/24* (2006.01)
*G01B 5/00* (2006.01)

(52) U.S. Cl.
CPC ............ *G01B 11/24* (2013.01); *G01B 5/0004* (2013.01); *G01B 5/0025* (2013.01)

(58) Field of Classification Search
CPC ... B62B 2202/24; B62B 3/146; B62B 3/1468; B62B 3/1476; B62B 5/0006; B62B 5/06;
(Continued)

(56) References Cited

U.S. PATENT DOCUMENTS 4,719,801 A * 1/1988 Blaser ....................... G01L 3/24
73/40
5,359,542 A * 10/1994 Pahmeier ............... B25J 9/1615
356/621
(Continued)

FOREIGN PATENT DOCUMENTS

CN         200977655 Y     11/2007
CN         101351683 A      1/2009
(Continued)

OTHER PUBLICATIONS

Chinese-language Office Action issued in counterpart Chinese Application No. 201780005327.X dated Sep. 18, 2019 with English translation (12 pages).
(Continued)

*Primary Examiner* — Michael P Stafira
(74) *Attorney, Agent, or Firm* — Crowell & Moring LLP

(57) ABSTRACT

A mobile measurement system for three-dimensional optical measurement of vehicles and vehicle parts, includes a measurement auxiliary device which can be arranged on the vehicle or vehicle part with repeat accuracy, and a mobile measurement trolley on which a robot is arranged, which carries at least one measurement sensor, and which further has a coupling apparatus for mechanically coupling to the measurement auxiliary device, enabling positioning of the measurement trolley relative to the measurement auxiliary device, and thus relative to the vehicle or vehicle part, with repeat accuracy.

13 Claims, 3 Drawing Sheets

(58) Field of Classification Search
CPC . B62B 5/0096; B62B 5/049; B62B 2205/006; B62B 3/02; B62B 3/1424; B62B 11/00; B62B 1/008; B62B 1/26; B62B 2202/025; B62B 2206/06; B62B 2207/02; B62B 3/00; B62B 3/10; B62B 3/14; B62B 3/1404; B62B 3/1488; G01N 23/04; G01N 23/043; G01N 29/225; G01N 29/265; G01N 2021/9542; G01N 21/954; G01N 2223/613; G01N 2223/628; G01N 2291/056; G01N 2291/106; G01N 2291/2634; G01N 2291/269; G01N 2291/2694; G01N 23/00; G01N 23/005; G01N 23/025; G01N 27/82; G01N 29/04; G01N 29/2456; G01N 29/262; G01N 2021/95661; G01N 21/95684; G01N 35/00584; G01N 35/0099; G01B 5/0004; G01B 5/008

See application file for complete search history.

(56) References Cited

U.S. PATENT DOCUMENTS

| | | | | |
|---|---|---|---|---|
| 5,438,525 | A * | 8/1995 | Shimbara | B62D 65/005 |
| | | | | 702/35 |
| 5,528,505 | A | 6/1996 | Granger et al. | |
| 5,532,816 | A | 7/1996 | Spann et al. | |
| 10,323,932 | B1 * | 6/2019 | Adams | G01B 11/0633 |
| 2003/0089183 | A1 * | 5/2003 | Jacobsen | G01N 29/045 |
| | | | | 73/865.8 |
| 2007/0097382 | A1 | 5/2007 | Granger | |
| 2007/0113690 | A1 * | 5/2007 | Wilcox | G01N 29/225 |
| | | | | 73/865.9 |
| 2008/0250842 | A1 | 10/2008 | Nobis et al. | |
| 2010/0208416 | A1 * | 8/2010 | Shoda | H02B 13/0354 |
| | | | | 361/606 |
| 2010/0274390 | A1 | 10/2010 | Walser et al. | |
| 2014/0139659 | A1 * | 5/2014 | Lim | G01N 21/9515 |
| | | | | 348/92 |
| 2015/0032387 | A1 * | 1/2015 | Froom | G01N 29/225 |
| | | | | 702/33 |
| 2015/0292999 | A1 | 10/2015 | Futatsuka et al. | |
| 2018/0059029 | A1 * | 3/2018 | Yeum | G01N 21/8806 |

FOREIGN PATENT DOCUMENTS

| | | |
|---|---|---|
| CN | 101909828 A | 12/2010 |
| CN | 101949687 A | 1/2011 |
| CN | 101957176 A | 1/2011 |
| CN | 104769411 A | 7/2015 |
| CN | 104865897 A | 8/2015 |
| CN | 105257044 A | 1/2016 |
| CN | 205074157 U | 3/2016 |
| DE | 10 2007 017 675 A1 | 10/2008 |
| DE | 10 2008 001 617 A1 | 11/2009 |
| DE | 10 2004 046 752 B4 | 10/2010 |
| DE | 10 2009 039 811 A1 | 3/2011 |
| DE | 10 2010 032 467 A1 | 2/2012 |
| DE | 10 2014 106 641 A1 | 11/2015 |
| DE | 10 2015 204 473 A1 | 9/2016 |
| EP | 1 777 494 B1 | 7/2008 |
| JP | 2007-24764 A | 2/2007 |
| JP | 2007-260799 A | 10/2007 |
| JP | 4877105 B2 | 2/2012 |

OTHER PUBLICATIONS

International Search Report (PCT/ISA/210) issued in PCT Application No. PCT/EP2017/056605 dated Jun. 9, 2017 with English translation (five pages).

German-language Written Opinion (PCT/ISA/237) issued in PCT Application No. PCT/EP2017/056605 dated Jun. 9, 2017 (five pages).

German-language Search Report issued in counterpart German Application No. 10 2016 205 519.4 dated Jan. 12, 2017 with partial English translation (10 pages).

\* cited by examiner

MOBILE MEASUREMENT SYSTEM FOR THE THREE-DIMENSIONAL OPTICAL MEASUREMENT OF VEHICLES AND VEHICLE PARTS

CROSS REFERENCE TO RELATED APPLICATIONS

This application is a continuation of PCT International Application No. PCT/EP2017/056605, filed Mar. 21, 2017, which claims priority under 35 U.S.C. § 119 from German Patent Application No. 10 2016 205 519.4, filed Apr. 4, 2016, the entire disclosures of which are herein expressly incorporated by reference.

BACKGROUND AND SUMMARY OF THE INVENTION

The invention relates to a measurement system for the optical measurement of vehicles and vehicle parts.

Contactless and, in particular, optical measuring systems have been used for several years in automobile manufacturing for the three-dimensional measurement or measuring of vehicles and vehicle parts. Such systems are disclosed, for example, in DE 10 2004 046 752 B4 and DE 10 2014 106 641 A1. In the case of the disclosed systems, the measuring sensor is moved relative to the measurement object (vehicle or vehicle part) by means of a multi-axis robot or the like. These are stationary systems. Additionally disclosed for simple measurement tasks is arranging the measuring sensor on a mobile or portable stand, for example a stand in the manner shown in DE 10 2008 001 617 A1. However, the problem here is the repeatably accurate positioning with respect to the measurement object. In addition, it is not possible to measure the measurement object in an automated or part-automated manner using this system.

The object of the invention is to provide a measurement system for the three-dimensional optical measurement of vehicles and vehicle parts which eliminates or at least minimizes one or more disadvantages of the prior art.

This and other objects are achieved by a mobile measurement system according to the invention for the three-dimensional optical measurement of vehicles and vehicle parts. The mobile measurement system includes:

at least one measurement auxiliary device which can be attached in a repeatably accurate manner (i.e. with a defined position and alignment) on the vehicle or vehicle part or on which the vehicle or vehicle part can be arranged in a repeatably accurate manner; and a mobile measurement trolley on which a robot, which carries at least one measurement sensor or the like, is arranged, wherein said mobile measurement trolley additionally comprises an, in particular adjustable, coupling device for coupling mechanically with the measurement auxiliary device, as a result of which it is possible to position the measurement trolley in a repeatably accurate manner relative to the measurement auxiliary device and, as a result, also relative to the vehicle or vehicle part.

In a preferred manner, the measurement auxiliary device is only required for positioning and aligning the measurement trolley relative to the measurement object, i.e. to the vehicle or vehicle part, and can then be removed or dismantled again such that it is not able to impair the actual operation of the measurement.

The measurement system according to the invention comprises a driven robot which, in the usual manner, enables an automated or at least partially automated measurement of the measurement object. In addition, the measurement system according to the invention is realized so as to be mobile or portable and can consequently be used in different locations (measurement sites). Repeatably accurate positioning between the robot and the measurement object (vehicle or vehicle part) works indirectly as a result of the mechanical coupling between the measurement trolley and the measurement auxiliary device. The measurement system according to the invention enables the repeatably accurate positioning of the measurement trolley or of the robot fastened thereon relative to the vehicle (also similar vehicles of a derivative) or vehicle part to be measured which is necessary, in particular, for the automatic measurement operation. The measurement system according to the invention additionally makes it possible to setup and align the measurement system components in a simple, time-saving and ergonomic manner. In addition, in the case of multiple measurement tasks, it is possible to re-position the measurement system components in a simple, rapid and ergonomic manner. There is also a large degree of flexibility as regards different measurement tasks or applications.

In a preferred manner, the measurement trolley comprises several ground rollers (for example four or five) by way of which the measurement trolley is able to be moved or pushed, and three supporting feet which are extendible by way of a lifting system (in particular with electric drive) and make it possible for the measurement trolley to stand in a fixed, sturdy and tip-resistant manner. As an option, at least one of the ground rollers can also be provided with a parking brake.

In a preferred manner, the measurement auxiliary device also comprises several ground rollers by way of which the measurement auxiliary device is able to be pushed, wherein in a preferred manner at least one of said ground rollers is provided with a parking brake.

In a preferred manner, the coupling device of the measurement trolley is adjustable in all three directions in space in order to make possible optimum coupling, which is dependent on the measurement task, with the measurement auxiliary device.

In a preferred manner, the coupling device of the measurement trolley comprises several, in a preferred manner two, coupling bolts, wherein the measurement auxiliary device is realized with corresponding coupling bores in which the coupling bolts are able to engage in a positive locking manner.

The coupling bolts on the measurement trolley can be driven by motor (for example by means of an electric motor) such that they are able to engage automatically in the coupling bores on the measurement auxiliary device. As a result, coupling and uncoupling are made easier and the ergonomics are improved.

The coupling bores on the measurement auxiliary device can be arranged in a grid, as a result of which different, although defined nonetheless, relative positions between the measurement trolley and the measurement auxiliary device are made possible.

The measurement trolley and/or the measurement auxiliary device can comprise pushing aids or auxiliary devices for manual pushing. These are, for example, handles, grab rods or the like.

The mobile measurement system according to the invention is used in a preferred manner for measuring or measurement of a vehicle, in particular a passenger vehicle. To this end, the measurement auxiliary device is realized in a preferred manner as an L-shaped frame, the one frame leg thereof being positioned on a longitudinal side of the vehicle and the other frame leg thereof being positioned on the front or rear side of the vehicle. The L-shaped frame makes it possible for the mobile measurement trolley to be able to be positioned in any arbitrary position around the vehicle. A high degree of flexibility and series independence are produced as a result. In a preferred manner, the measurement system according to the invention also includes separate locator elements or spacers which can be fastened or supported in a damage-free manner, for example, on the wheels of the vehicle and which adjust or predetermine a defined and reproducible spacing between the L-shaped frame and the vehicle. In a preferred manner, the frame legs of the frame are connected together in an articulated manner and as a result are collapsible.

The measurement system according to the invention can also be used for other measurement processes which are not optical, but which measure contactlessly in a similar, in particular equivalent manner.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
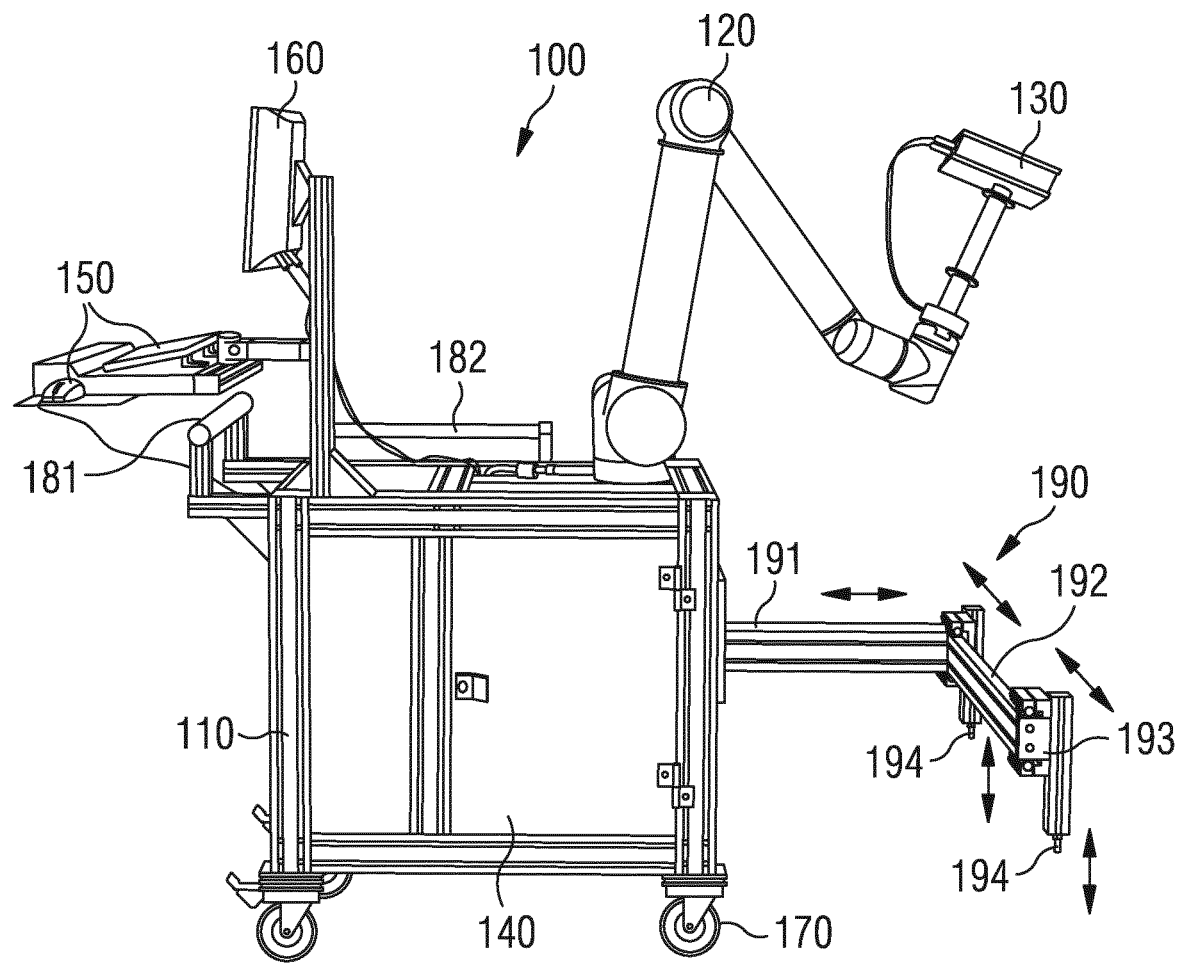
FIG. 1 is a perspective view of a measurement trolley which is associated with the measurement system according to an embodiment of the invention.

The measurement trolley 100 shown in FIG. 1 includes a framework 110 which is composed of profiles and on which a light multi-axis robot 120 is fastened. The robot arm of the robot 120 carries a measurement sensor or measurement head 130 for three-dimensional optical measurement of a measurement object. The measurement sensor 130 can be moved by way of the robot 120. The measurement procedure, including the robot arm movements, is controlled by a control device 140, typically a computer, arranged in the interior of the framework 110. Communication with the control device 140 is effected by way of an input device (keyboard and mouse) 150 and a monitor 160. The measurement trolley or robot trolley 100 is realized in a mobile manner, to which end it has several ground rollers (fixed castors) 170 and handles 181 and 182 which function as pushing aids.

The measurement trolley 100 additionally includes a coupling device 190 which includes two coupling bolts 194. The coupling bolts 194 are fastened on a rail 192 so as to be horizontally displaceable. The rail 192 is fastened on the framework 110 by means of a retractable and extendible carrier 191. The coupling bolts 194 can also be moved vertically by motor-driven actuating mechanisms 193. Consequently, the coupling device 190 is adjustable in all three directions in space, as illustrated by the double arrows. The function of the coupling device 190 will be explained in more detail below.

Figure 2:
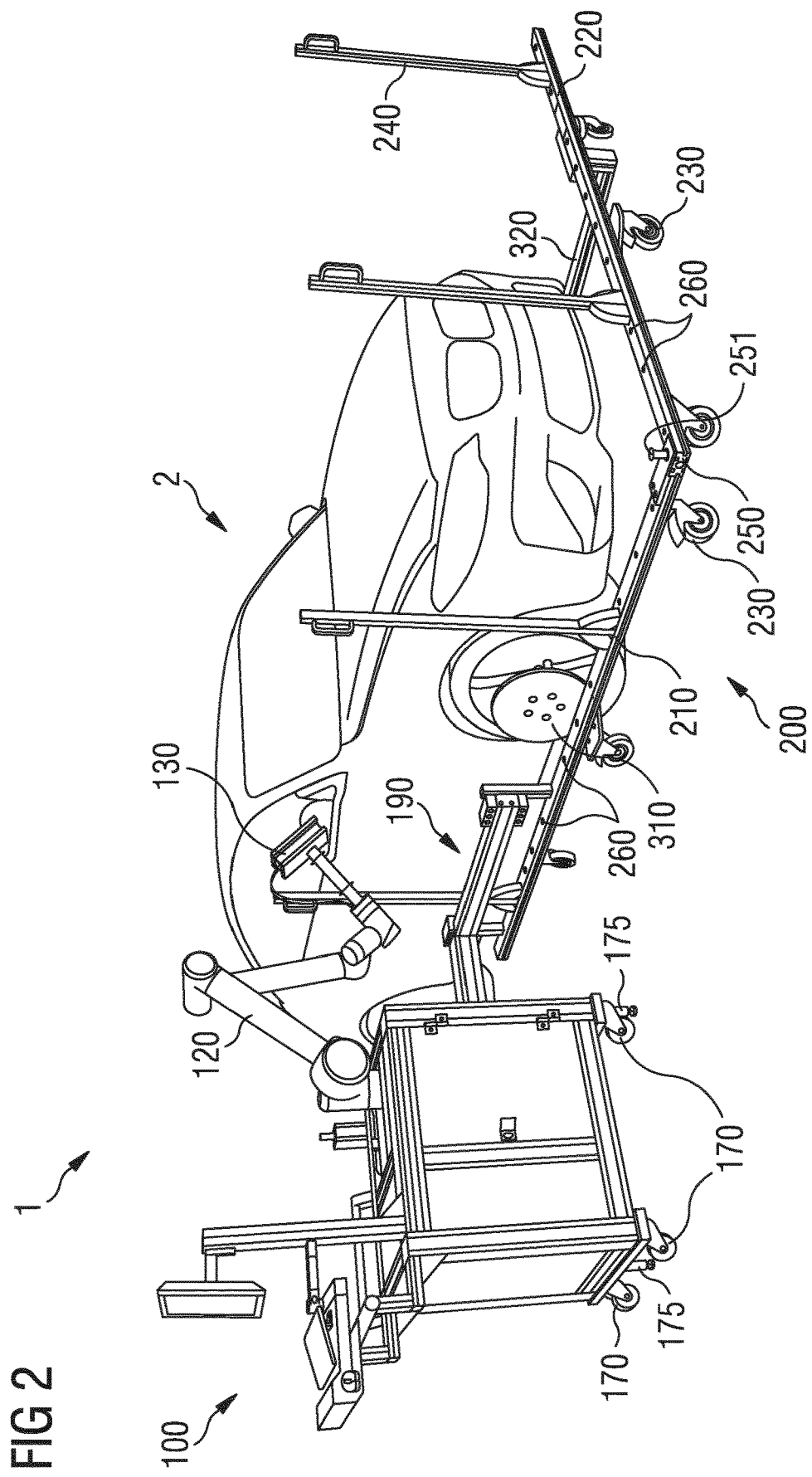
FIG. 2 is a perspective view of a measurement system according to an embodiment of the invention when measuring a vehicle.

FIG. 2 shows a measurement system 1 with a measurement trolley 100 according to FIG. 1 during the measuring or measurement of a vehicle 2. The vehicle 2 and the mobile measurement trolley 100 stand on a floor area, for example a hall floor. In order to enable precise and repeatably accurate positioning of the measurement trolley 100 with respect to the vehicle 2, there is provided a measurement auxiliary device 200 which is associated with the measurement system 1, this being an L-shaped trolley or frame. The frame 200, which is also provided with ground rollers (fixed castors) 230 and as a result is mobile, includes two frame legs 210 and 220 and several grip rods 240 which function as pushing aids. The length of the frame legs 210 and 220, for example, is between 2 m and 4 m. The two frame legs 210 and 220, which are arranged at right angles with respect to one another, are connected via a joint 250 such that the frame 200 is able to be collapsed in a space-saving manner when not in use. The joint 250 comprises a locking mechanism which is able to be released by way of the latching bolt 251.

In the example shown, one of the frame legs 210 is positioned on the right-hand longitudinal side of the vehicle 2 and the other frame leg 220 is positioned on the front side of the vehicle 2. The correct positioning works by way of a first locator element 310, this being a disk which is fastened magnetically on the wheel screws of the right-hand front wheel of the vehicle 2, and a second locator element 320 which is supported in a chock-like manner on the left-hand front wheel of the vehicle 2 and projects forward beyond the vehicle outline. The two locator elements 310 and 320 form stops against which the frame legs 210 and 220 of the frame 200 can be moved to abut and, in this case, take up a defined spacing from the vehicle 2. In this respect, the locator element 310 and 320 can also be designated as spacers.

The measurement trolley 100 is mechanically coupled with the frame 200, for which purpose the coupling bolts 194 of the coupling device 190 engage in corresponding coupling bores 260 in the frame leg 210. As a result of the positive locking closure, the measurement trolley 100 is aligned relative to the frame 200, and as a result relative to the vehicle 2. Both frame legs 210 and 220 of the measurement auxiliary device 200 are realized with a plurality of coupling bores 260 which are arranged in a grid (for example a 100 mm grid). The measurement trolley 100 can consequently also assume a different relative position with respect to the frame 200, in dependence on the measurement task, or can be coupled with the frame 200 at a different position.

The measurement system 1 is mobile and can be used in any location. The components of the measurement system 1 are set up at the place of measurement, for example in the arrangement shown in FIG. 2, as explained in more detail below, and are dismantled again on completion of the measurement. Simple and ergonomic handling is made possible in this case. If the same vehicle 2 or the same vehicle model is to be measured again subsequently, the system components are able to be set up again in the same arrangement, even at a different location, repeatably accurate positioning of the measurement trolley 100 with respect to the vehicle 2 being made possible within the necessary tolerance (this is typically in the centimeter range). In addition, the power can be supplied by a power pack which is arranged in the measurement trolley 100 such that the measurement system 1 is also operable independently of an external power supply.

To set up the measurement system 1, the locator elements 310 and 320 are first of all arranged on the vehicle 2. The frame or L-shaped trolley 200 is then aligned with the locator elements 310 and 320 and fixed as a result of locking the ground rollers 230. The measurement trolley 100 can then be coupled with the frame 200 in a desired position or in a position determined by earlier measurements, to which end said measurement trolley is positioned relative to the frame 200, the coupling unit 190 is adjusted and the coupling bolts 194 are lowered by way of the actuating mechanisms 193 such that they engage in a positive locking manner in the corresponding coupling bores 260 of the frame 200.

The extendible carrier 191 and the bearing rail 192 of the coupling unit 190 are provided with graduations which enable the restoring of a specific setting. In addition, the bores 260 are numbered on the frame 200 in order to enable the restoring of a specific engagement pairing. Once the measurement trolley 100 is correctly positioned, it is locked as a result of extending three supporting feet 175, which enable a tip-resistant 3-point base. As an option, only the frame 200 and the locator elements 310 and 320 can be removed again so that they do not impair the measurement. Where applicable, reference marks or the like are also applied to the vehicle 2 to be measured. The measurement can then be started, to which end, for example, the robot 120 or the robot arm thereof with the measurement head 130 fastened thereon can be manually controlled via the input device 150 or a previously generated measurement program is started. (The measurement system 1 according to the invention makes it possible to run stored measurement programs for the relevant vehicle model or a similar vehicle model in a safe manner automatically as the always same positioning of the L-shaped trolley 200 with respect to the vehicle 2 ensures the repeatably accurate positioning and alignment of the measurement trolley 100 relative to the vehicle 2). In a preferred manner, the evaluation of the measurement is also taken over by the control device 140. Further measurements can also be performed on the vehicle 2, to which end it is also possible to re-position the measurement trolley 100 and/or the frame 200 where applicable.

Figure 3:
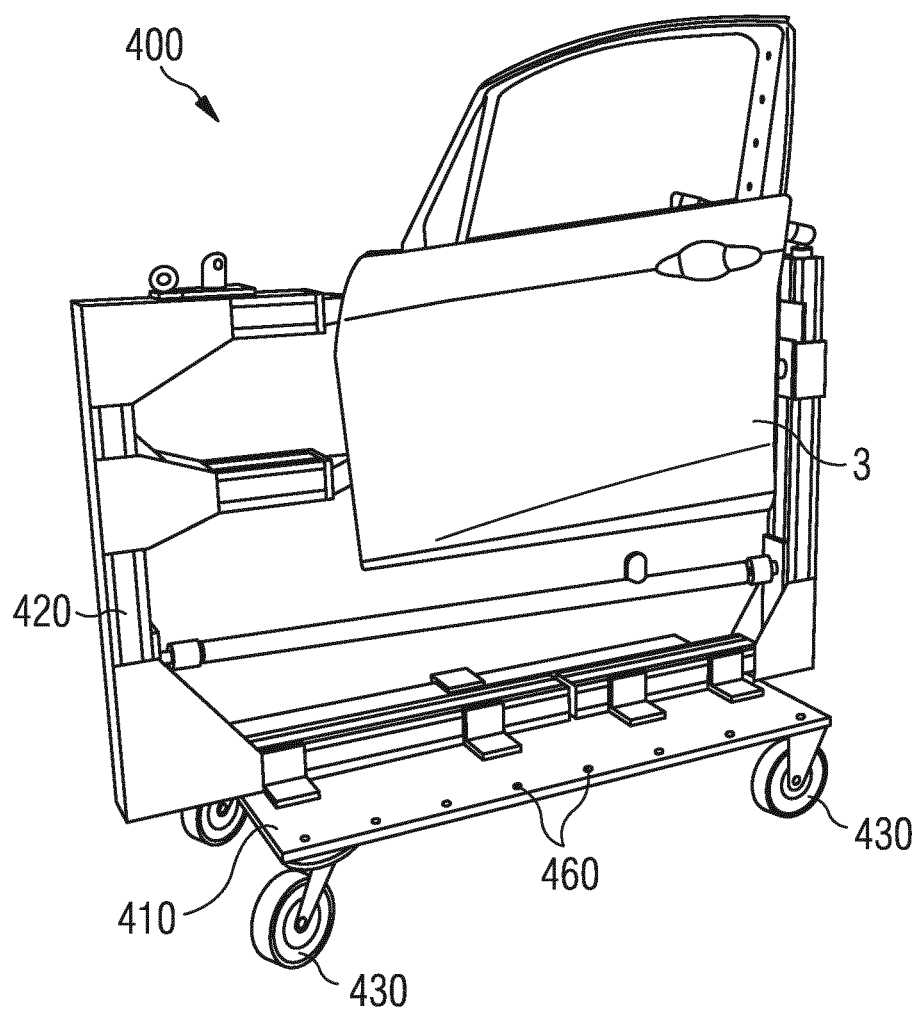
FIG. 3 is a perspective view of a measurement auxiliary device which is associated with the measurement system according to an embodiment of the invention, with a vehicle door arranged thereon.

FIG. 3 shows a different measurement auxiliary device 400 which includes a base plate 410 and a framework 420 on which a vehicle part 3 to be measured (a vehicle door as an example) is fastened. The measurement auxiliary device 400 additionally has lockable ground rollers 430. The base plate 410 is realized with a plurality of coupling bores 460 which are arranged in a grid. Analogously to the previous explanations, the measurement trolley 100 can be aligned relative to the measurement auxiliary device 400 and as a result relative to the vehicle part 3 as a result of engagement of the coupling bolts 194 in the coupling bores 460. One assembly or an entire vehicle 2 can also be arranged on such a measurement auxiliary device 400.

LIST OF REFERENCES

1 Measurement system
2 Vehicle
3 Vehicle part
100 Measurement trolley
110 Framework
120 Robot
130 Measurement sensor
140 Control device
150 Input device
160 Monitor
170 Ground roller
175 Supporting foot
181 Handle
182 Handle
190 Coupling device
191 Carrier
192 Rail
193 Actuating mechanism
194 Coupling bolt
200 Measurement auxiliary device
210 Frame leg
220 Frame leg
230 Ground roller
240 Grab rod
250 Joint
251 Latching bolt
260 Coupling bolt
310 Locator element
320 Locator element
400 Measurement auxiliary device
410 Base plate
420 Framework
430 Ground roller
460 Coupling bores The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A mobile measurement system for three-dimensional optical measurement of vehicles and vehicle parts, comprising:
   a measurement auxiliary frame which is attached in a repeatably accurate manner on the vehicle or vehicle part or on which the vehicle or the vehicle part is arrangeable in a repeatably accurate manner; and
   a mobile measurement trolley on which a robot, which carries at least one measurement sensor, is arranged and which additionally comprises a coupler to mechanically fix the mobile measurement trolley with the measurement auxiliary frame, as a result of which it is possible to position the measurement trolley in a repeatably accurate manner relative to the measurement auxiliary frame and, as a result, relative to the vehicle or the vehicle part.

2. The mobile measurement system as claimed in claim 1, wherein
   the measurement trolley comprises several ground rollers by way of which the measurement trolley is able to be pushed; and
   three supporting feet which are extendible and make it possible for the measurement trolley to stand in a three-point support.

3. The mobile measurement system as claimed in claim 1, wherein
   the measurement auxiliary frame comprises several ground rollers by way of which the measurement auxiliary frame is able to be pushed.

4. The mobile measurement system as claimed in claim 1, wherein
   the coupler of the measurement trolley is adjustable in all three directions in space.

5. The mobile measurement system as claimed in claim 1, wherein
   the coupler of the measurement trolley comprises several coupling bolts, and the measurement auxiliary frame is configured with corresponding coupling bores in which the coupling bolts are able to engage.

6. The mobile measurement system as claimed in claim 5, wherein
the coupling bolts are driven by motor such that they are able to engage automatically in the coupling bores.

7. The mobile measurement system as claimed in claim 5, wherein
the coupling bores on the measurement auxiliary frame are arranged in a grid, whereby different relative positions between the measurement trolley and the measurement auxiliary frame are made possible.

8. The mobile measurement system as claimed in claim 6, wherein
the coupling bores on the measurement auxiliary frame are arranged in a grid, whereby different relative positions between the measurement trolley and the measurement auxiliary frame are made possible.

9. The mobile measurement system as claimed in claim 4, wherein
the coupler of the measurement trolley comprises several coupling bolts, and
the measurement auxiliary frame is configured with corresponding coupling bores in which the coupling bolts are able to engage.

10. The mobile measurement system as claimed in claim 9, wherein
the coupling bores on the measurement auxiliary frame are arranged in a grid, whereby different relative positions between the measurement trolley and the measurement auxiliary frame are made possible.

11. The mobile measurement system as claimed in claim 1, wherein
the measurement trolley and/or the measurement auxiliary frame comprises at least one pushing aid for manual pushing.

12. The mobile measurement system as claimed in claim 1, wherein
the measurement auxiliary frame is realized as an L-shaped frame, one frame leg thereof being positioned on a longitudinal side of a vehicle and the other frame leg thereof being positioned on a front or rear side of the vehicle, and
separate locator elements, which are fastened or supported on the wheels of the vehicle, are provided for said positioning.

13. The mobile measurement system as claimed in claim 12, wherein
the frame legs of the L-shaped frame are connected via a joint so as to be collapsible.

* * * * *